US012035793B2

(12) United States Patent
Paliobeis et al.

(10) Patent No.: US 12,035,793 B2
(45) Date of Patent: Jul. 16, 2024

(54) HAIR APPLIANCE SWITCH MECHANISM

(71) Applicant: Helen of Troy Limited, St. Michael (BB)

(72) Inventors: Steven J. Paliobeis, El Paso, TX (US); Luke Hillebrecht, El Paso, TX (US)

(73) Assignee: Helen of Troy Limited, St. Michael (BB)

( * ) Notice: Subject to any disclaimer, the term of this patent is extended or adjusted under 35 U.S.C. 154(b) by 894 days.

(21) Appl. No.: 17/089,108

(22) Filed: Nov. 4, 2020

(65) Prior Publication Data

US 2022/0133011 A1 May 5, 2022

(51) Int. Cl.
*A45D 20/12* (2006.01)
*A45D 1/04* (2006.01)
(Continued)

(52) U.S. Cl.
CPC ............... *A45D 20/12* (2013.01); *A45D 1/04* (2013.01); *A45D 2/001* (2013.01); *G05G 1/08* (2013.01);
(Continued)

(58) Field of Classification Search
CPC .. H01H 1/36; H01H 3/00; H01H 3/02; H01H 3/08; H01H 3/20; H01H 3/32; H01H 9/06; H01H 15/00; H01H 15/02; H01H 15/10; H01H 15/16; H01H 19/00; H01H 19/14; H01H 19/20; H01H 25/00; H01H 25/002; H01H 25/006; H01H 2003/08; H01H 2003/10; H01H 2019/00; H01H 2019/14; H01H 2025/00; H01H 2025/048; H01H 2221/00; H01H 2221/01; G05G 1/08; G05G 1/10; G05G 5/06; G05G 5/16;
(Continued)

(56) References Cited

U.S. PATENT DOCUMENTS

| | | | | | |
|---|---|---|---|---|---|
| 4,167,660 | A * | 9/1979 | Liedtke | .................... | H01H 9/06 392/383 |
| 4,309,595 | A | 1/1982 | Long et al. | | |
| 6,671,460 | B1 | 12/2003 | Smal | | |
| 8,754,343 | B2 | 6/2014 | Shedletsky et al. | | |

(Continued)

FOREIGN PATENT DOCUMENTS

| | | |
|---|---|---|
| CN | 103021691 | 4/2013 |
| DE | 19714834 | 10/1998 |

(Continued)

OTHER PUBLICATIONS

Written Opinion and International Search Report for PCT/US2021/057193 issued on Feb. 17, 2022, 9 pages.

*Primary Examiner* — Anthony R Jimenez

(74) *Attorney, Agent, or Firm* — Rankin, Hill & Clark LLP

(57) ABSTRACT

A hair appliance includes a handle, an electrical component coupled with the handle, and a switch mechanism in electrical communication with the electrical component and a power source. The electrical component has a plurality of settings. The switch mechanism includes a switch and a rotatable adjustment member. The switch has multiple positions and includes a sliding actuator. Each position corresponds to a respective setting for the electrical component. The rotatable adjustment member includes a contact surface operatively coupled with the sliding actuator such that rotational movement of the rotational adjustment member results in translational movement of the sliding actuator.

18 Claims, 8 Drawing Sheets

(51) Int. Cl.

| | |
|---|---|
| ***A45D 2/00*** | (2006.01) |
| ***G05G 1/08*** | (2006.01) |
| ***G05G 1/10*** | (2006.01) |
| ***G05G 5/06*** | (2006.01) |
| ***G05G 5/16*** | (2006.01) |

(52) U.S. Cl.
CPC ................. *G05G 1/10* (2013.01); *G05G 5/06* (2013.01); *G05G 5/16* (2013.01)

(58) Field of Classification Search
CPC ...... A45D 20/00; A45D 20/001; A45D 20/08; A45D 20/10; A45D 20/1212; A45D 1/04; A45D 2/00; A45D 2/001; A45D 2/08; A45D 2/10; A45D 20/12
USPC ........................................................... 200/547
See application file for complete search history.

(56) References Cited

U.S. PATENT DOCUMENTS

| | | | | |
|---|---|---|---|---|
| 10,668,613 | B2 | 6/2020 | Ogle et al. | |
| 10,749,999 | B2 | 8/2020 | Miehl et al. | |
| 2007/0169369 | A1 | 7/2007 | Lok et al. | |
| 2007/0278205 | A1 | 12/2007 | Pencook | |
| 2012/0266483 | A1 * | 10/2012 | Palermo ................. | A45D 20/10 34/97 |
| 2017/0236662 | A1 | 8/2017 | Andaluz Sorli | |
| 2018/0055183 | A1 | 3/2018 | Carson et al. | |

FOREIGN PATENT DOCUMENTS

| | | |
|---|---|---|
| EP | 0057277 | 8/1982 |
| KR | 102014436 | 8/2019 |
| WO | 80/01736 | 8/1980 |

* cited by examiner

HAIR APPLIANCE SWITCH MECHANISM

BACKGROUND

Actuation of a switch in a hair appliance is typically accomplished via a rocker switch or a linear switch that is moved in the direction of the normal operation of the switch. In the evolution of hair appliances, additional settings are being desired for greater control of the appliance. When adding additional positions to a switch, e.g., four, five, six, or seven positions, the spacing between each setting needs to become smaller or the switch must get larger. A larger switch is typically less desirable for most hair appliance applications. Having small divisions between each setting can make it more difficult to select the correct setting, which can also be less desirable

SUMMARY

In view of the foregoing, a hair appliance includes a handle, an electrical component coupled with the handle, and a switch mechanism in electrical communication with the electrical component and a power source. The electrical component has a plurality of settings. The switch mechanism includes a switch and a rotatable adjustment member. The switch has multiple positions and includes a sliding actuator. Each position corresponds to a respective setting for the electrical component. The rotatable adjustment member includes a contact surface operatively coupled with the sliding actuator such that rotational movement of the rotational adjustment member results in translational movement of the sliding actuator.

In the hair appliance described above, and in embodiments described below, the electrical components can be a heater or a fan motor.

In each of the hair appliance embodiments described above, the sliding actuator can be configured to translate in a direction parallel to a rotational axis of the rotatable adjustment member. The rotational axis can be coincident with a longitudinal axis of the handle.

The switch mechanism can also include a slider operatively coupled with the sliding actuator. The handle can include a housing portion having an opening that receives the slider and confines the slider to translational movement. The slider can include a base and a post extending away from the base. The post can contact the contact surface. The base can also include a pocket that receives the sliding actuator. The rotatable adjustment member can include a slot defining at least a portion of the contact surface and the slot can receive the post. The contact surface can be one of a first contact surface and a second contact surface each defining a boundary of the slot. The first contact surface can be spaced from the second contact surface a distance equal to a diameter of the post. The rotatable adjustment member can include a ring and a flange extending away from the ring. The ring can be provided on the handle so as to be accessible to an operator of the hair appliance and the flange can include the slot. Alternatively, the flange can include the contact surface. The flange can be offset radially inwardly from an external surface of the ring.

In each of the hair appliance embodiments described above, the slider can include a post which can cooperate with the contact surface and/or the slot described above.

In each of the hair appliance embodiments described above, the hair appliance can include a housing portion, and the rotatable adjustment member and the housing portion can cooperate to define a detent mechanism having a plurality of positions corresponding to the multiple positions of the switch. For example, the ring of the rotatable adjustment member can include peaks and valleys and the housing portion can include a resilient tab having a bump. Each valley can correspond to one position among the plurality of positions corresponding to the multiple positions of the switch. Alternatively, the housing portion could include the peaks and valleys and the rotatable adjustment member could include the resilient tab having the bump.

DETAILED DESCRIPTION

Figure 1:
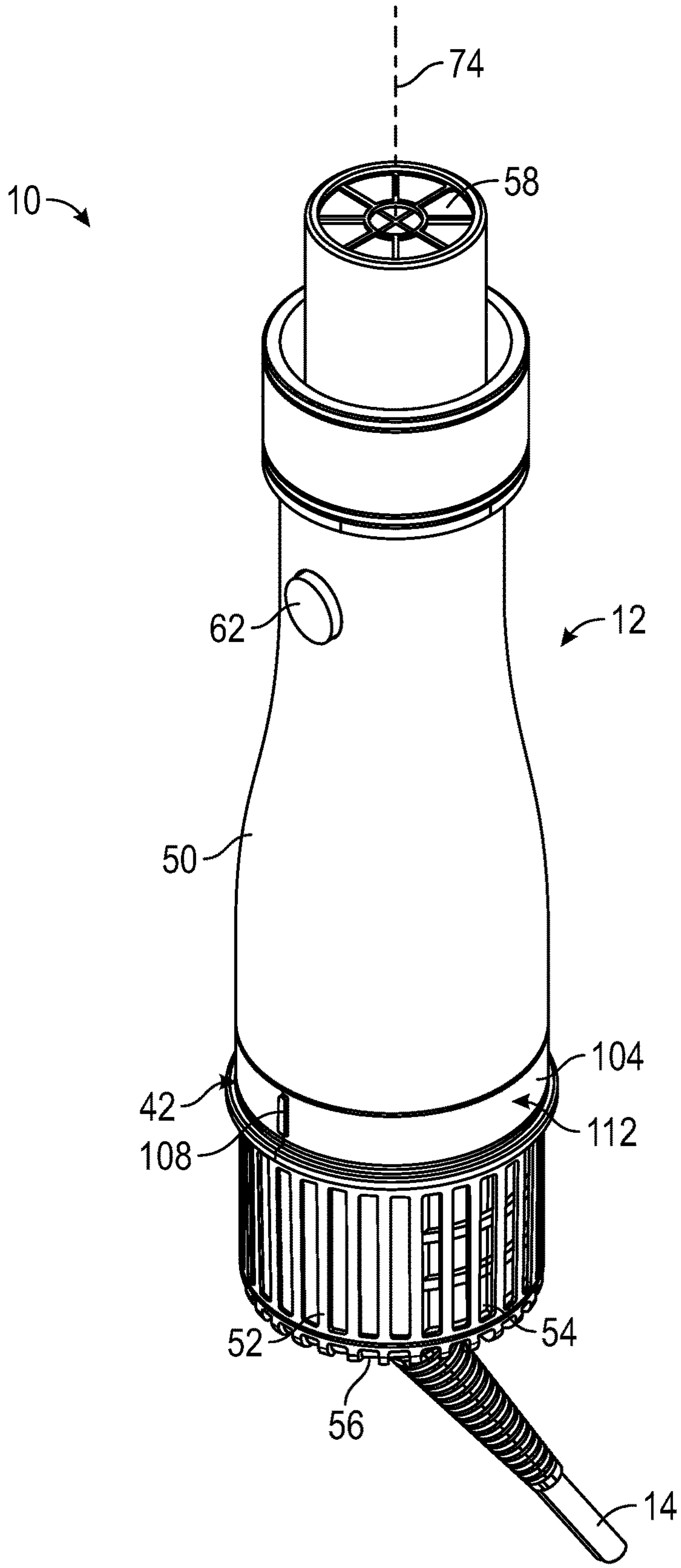
FIG. 1 is a perspective view of a portion of a hair appliance.

FIG. 1 depicts a portion of a hair appliance 10 and more particularly a handle 12 for the hair appliance 10. A head portion, which is not shown, of the hair appliance 10 attaches to the handle 12 at an end opposite a power cord 14 in the illustrated embodiment. The head portion could be a diffuser, a brush, a more standard hair dryer outlet, as well as heated plates, for example those more typically found in a hair straightener.

Figure 2:
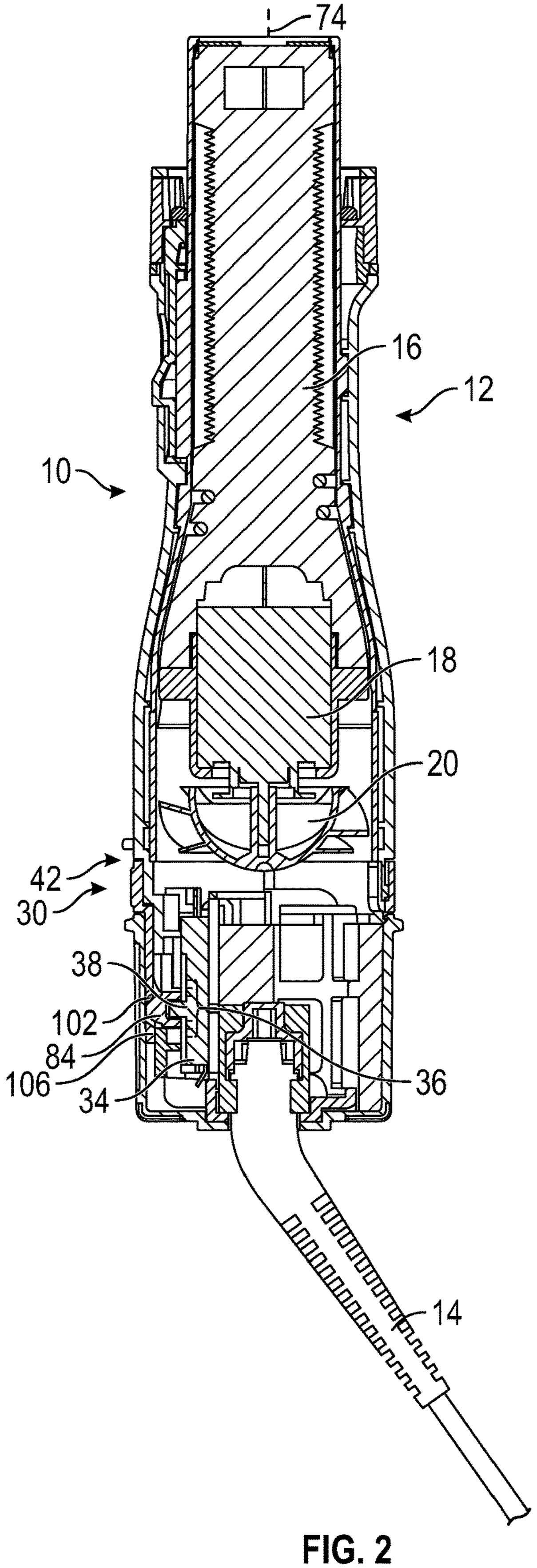
FIG. 2 is a longitudinal cross-sectional view of the portion of the hair appliance depicted in FIG. 1.

With reference to FIG. 2, the hair appliance 10 includes an electrical component, which in the illustrated embodiment is one of a heater 16 and a fan motor 18 that drives a fan blade 20. A switch mechanism 30 is in electrical communication with either electrical component, e.g., the heater 16 and/or the fan motor 18. The heater 16 can have a plurality of settings, e.g., different temperature settings, and the fan motor 18 can also have a plurality of settings, e.g., different RPM settings. The switch mechanism 30 would likely control the settings for one of the electrical components, and more than one such switch mechanism could be provided to control both electrical components. In addition, where the hair appliance 10 includes heated plates, such as those more typically found in a hair straightener, the switch mechanism 30 could be used to control different temperature settings for the heated plates.

The switch mechanism 30 is in electrical communication with the electrical components, e.g., the heater 16 and/or the fan motor 18 in the illustrated embodiment, and a power source (not shown) via the power cord 14. Alternatively, the power source could be a battery. The switch mechanism 30 includes a switch 34 having multiple positions and including a sliding actuator 38 moveable to each of the multiple positions 36. Each position 36 of the switch 34 corresponds to a respective setting for the electrical component, e.g., a particular temperature setting for the heater 16 and/or a particular fan speed for the fan motor 18.

Figure 3:
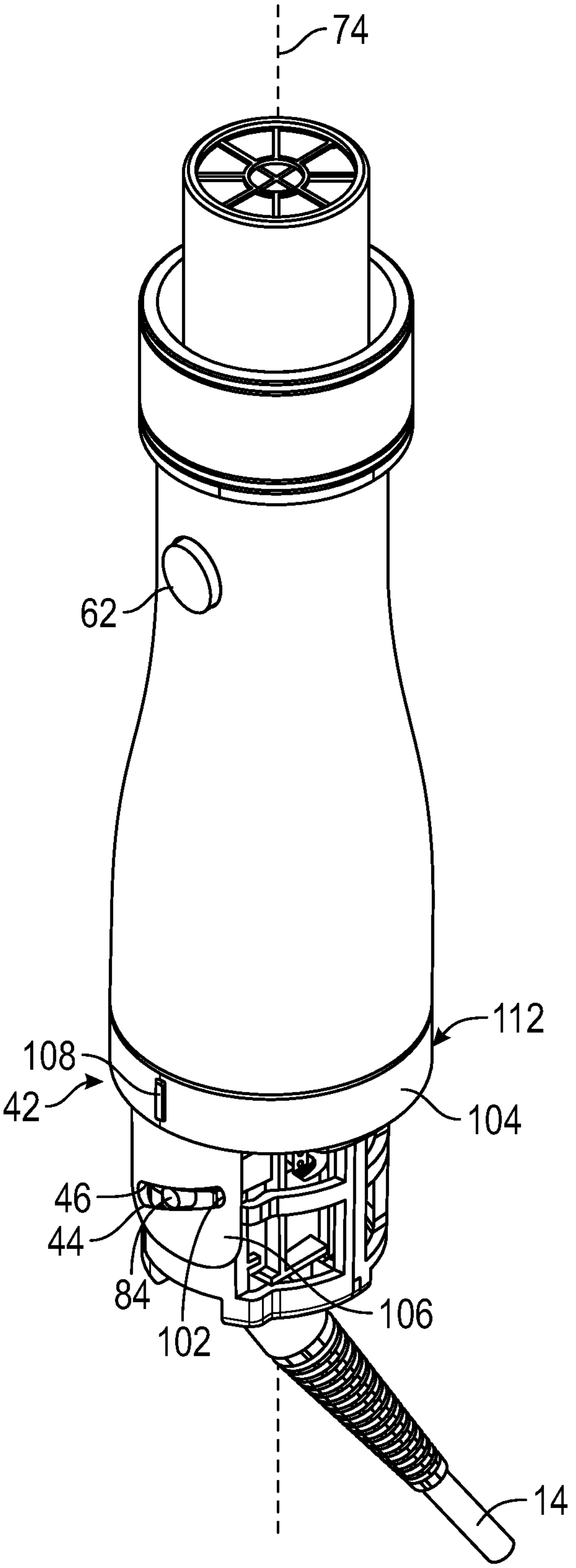
FIG. 3 is a perspective view of the portion of the hair appliance in FIG. 1 with a grill, cage, and foam removed to show a switch mechanism.

The switch mechanism 30 further includes a rotatable adjustment member 42, which is also visible in FIG. 3, including an contact surface, which in the illustrated embodiment includes a first contact surface 44 and a second contact surface 46, operatively coupled with the sliding actuator 38 such that rotational movement of the rotatable adjustment member 42 results in translational movement of the sliding actuator 38. The configuration of the switch mechanism 30 allows for greater travel of the rotatable adjustment member 42 between each position 36 on the switch 34 without growing the size of the switch 34. Actuation of the switch 34 occurs rotationally 90 degrees from the normal transverse (or linear) actuation of the switch 34. Such a switch mechanism 30 provides the operator of the hair appliance 10 fine control over the settings for the electrical components.

With reference back to FIG. 1, the handle 12 is defined by a housing 50 in which internal components of the hair appliance 10 are housed. A grill 52 and a cage 54 can attach to the housing 50 at a lower end of the handle 12. The grill 52 can define an air inlet 56 for the hair appliance 10 where air is directed from the air inlet 56 through the housing 50 toward an air outlet 58 for the handle 12 to be directed into the head (not shown) of the hair appliance 10. The hair appliance 10 can further include an on/off button 62 that can be actuated to control delivery of power to the hair appliance 10 and take many different configurations.

Figure 4:
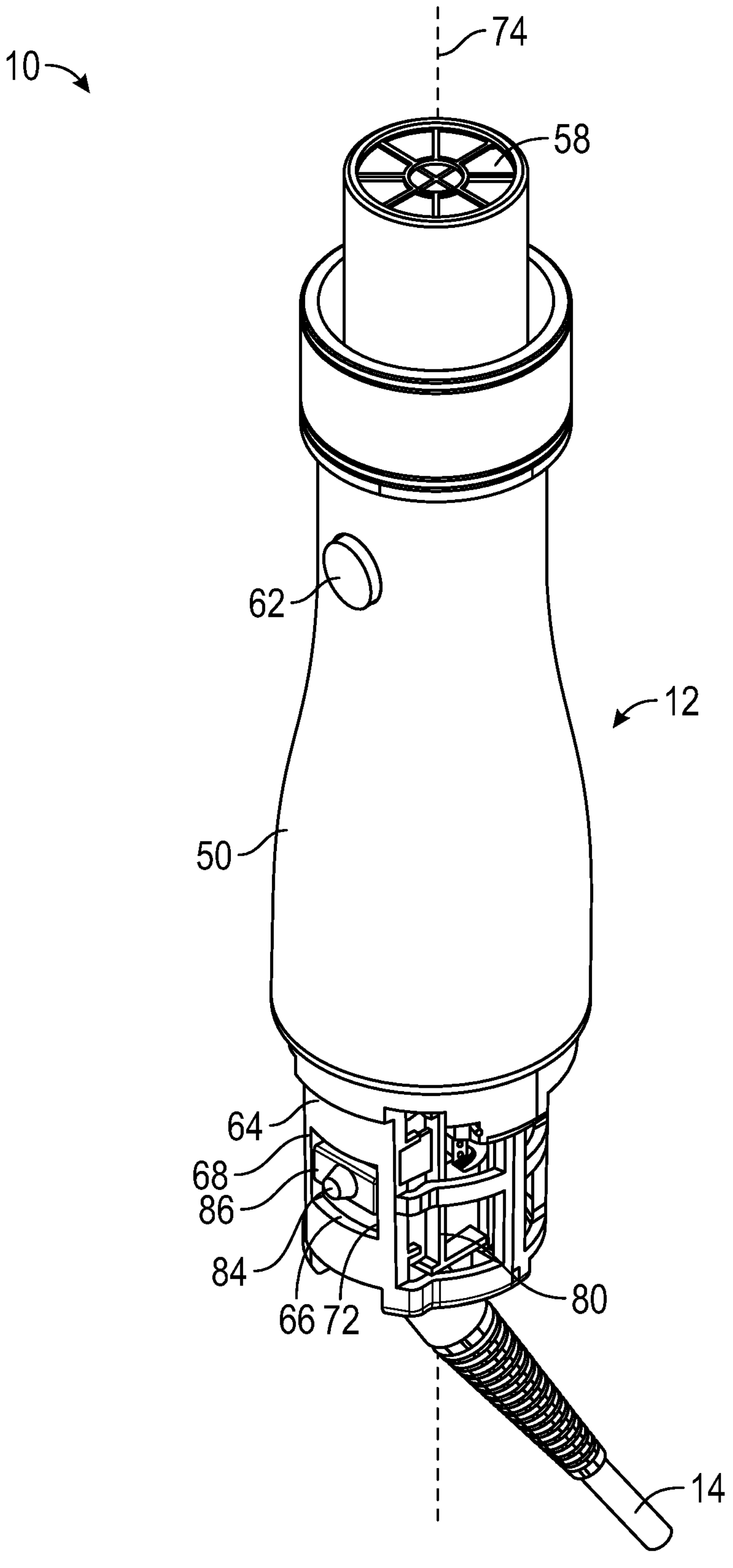
FIG. 4 is a perspective view of the portion of the hair appliance similar to FIG. 3, but with a rotatable adjustment member also removed.

FIG. 4 depicts the hair appliance 10 with the grill 52 and the cage 54 (as well as foam) not shown to expose a lower housing portion 64 having an opening 66. The opening 66 is defined by opposing sides 68, 72 that extend parallel with a longitudinal axis 74 of the handle 12.

Figure 5:
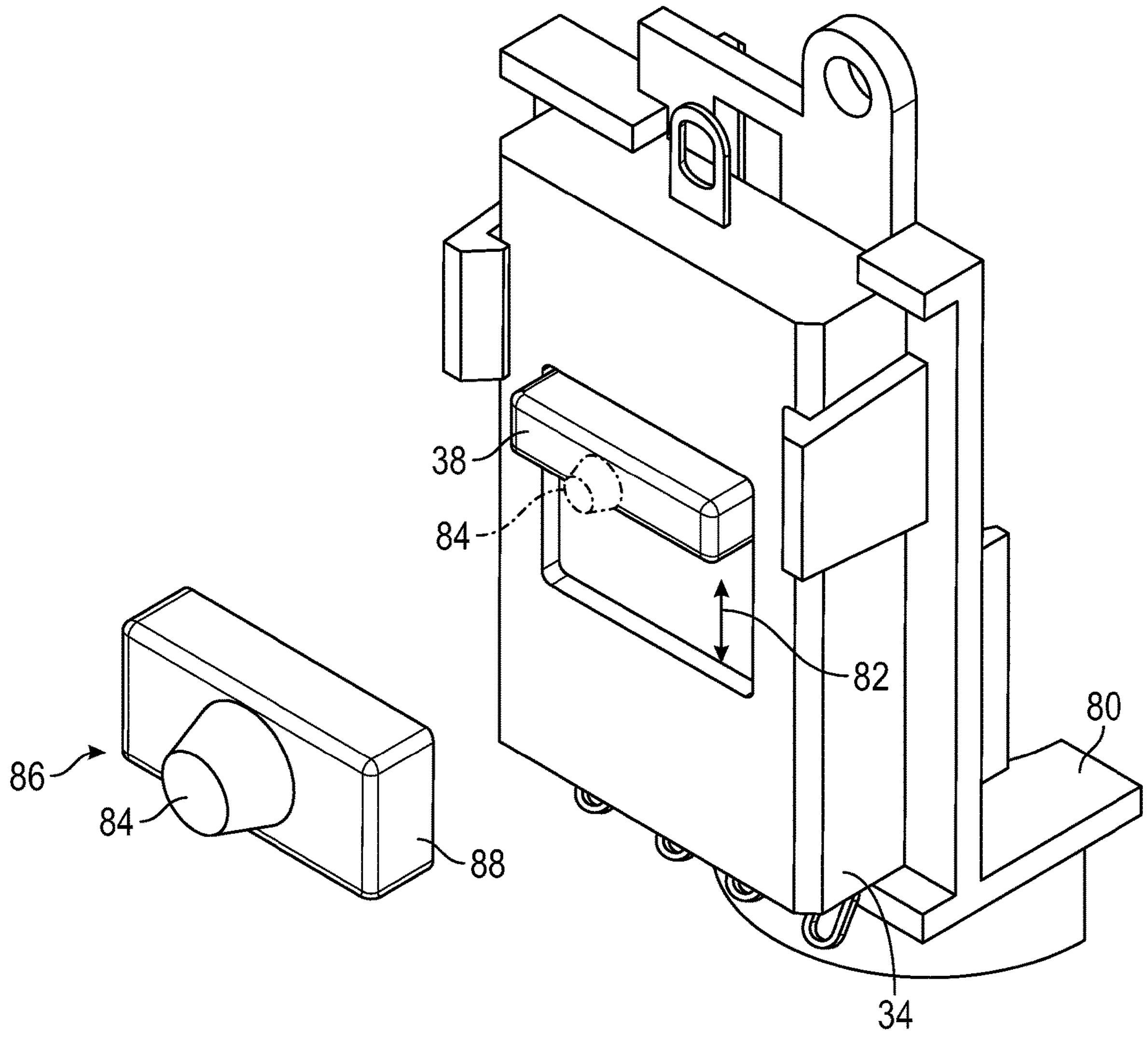
FIG. 5 is a close-up perspective view of a portion of the switch mechanism.
Figure 6:
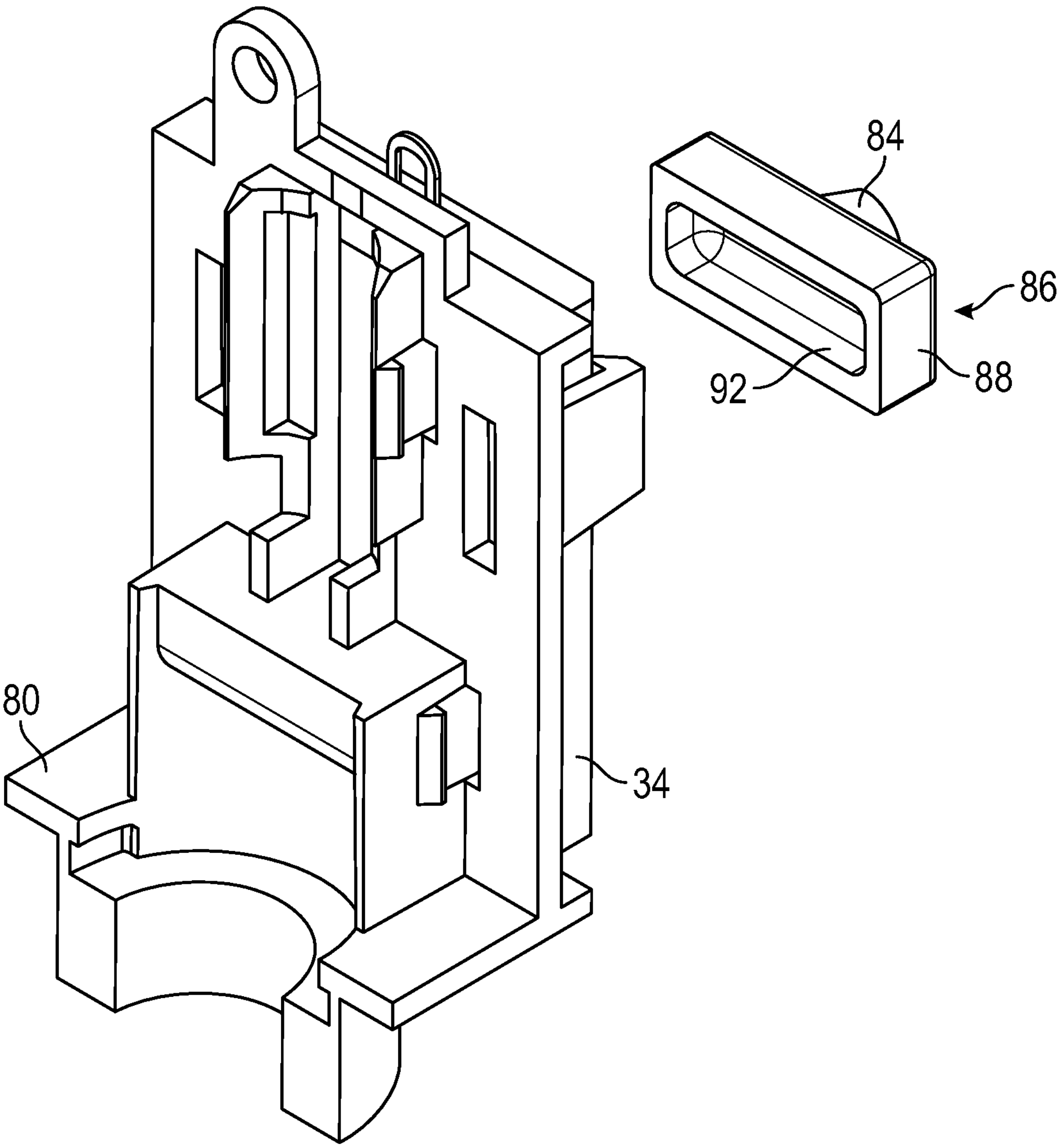
FIG. 6 is another close-up perspective view of the switch mechanism components depicted in FIG. 5 rotated about a vertical axis 180 degrees.

With reference to FIGS. 5 and 6, the switch 34 is shown mounted to a switch chassis 80 (also visible in FIG. 4) used to mount the switch 34 inside the housing 50. With reference to FIG. 5, the sliding actuator 38 is configured to translate in a direction, which is depicted by a double arrow 82, parallel to a rotational axis of the rotatable adjustment member 42, and this rotational axis can be coincident with the longitudinal axis 74 of the handle 12. In an embodiment the sliding actuator 38 can include a post 84, which is shown only in phantom in FIG. 5, operatively coupled with the contact surfaces 44, 46 (FIG. 3); however, in another embodiment, the switch mechanism 30 can include a slider 86 which can include the post 84. The slider 86 is configured to be operatively coupled with the sliding actuator 38, more particularly in instances where the sliding actuator 38 lacks the post 84. With reference back to FIG. 4, the lower housing portion 64 having the opening 66 receives the slider 86 and confines the slider 86 to translational movement in the direction of the double arrows 82 in FIG. 5 due to the configuration of the opposing sides 68, 72 of the opening 66. The slider 86 includes a base 88 that is complementary in shape to the opening 66 in the lower housing portion 64 to preclude movement of the slider 86 in directions other than those along the double arrow 82 (FIG. 5). The post 84 extends away from the base 88 and contacts the contact surfaces 44, 46 (FIG. 3). With reference to FIG. 6, the base 88 includes a pocket 92 that receives the sliding actuator 38 to operatively connect the slider 86 with the sliding actuator 38.

With reference back to FIG. 3, the rotatable adjustment member 42 includes a slot 102 defining at least a portion of each of the contact surfaces 44, 46. The slot 102 receives the post 84. As can be seen in FIG. 3, the post 84 contacts both of the first contact surface 44 and the second contact surface 46. More particularly, the first contact surface 44 is spaced from the second contact surface 46 a distance equal to a diameter of the post 84. Because of the interaction between the contact surfaces 44, 46 and the post 84, rotation of the rotatable adjustment member 42 in a counter-clockwise direction when looking from the top of the handle 12 down results in the slider 86 and the sliding actuator 38 moving in a downward direction per the orientation shown in FIG. 3. Rotation of the rotatable adjustment member 42 in a clockwise direction when looking from the top of the handle 12 down results in the slider 86 and the sliding actuator 38 moving in a upward direction per the orientation shown in FIG. 3.

Figure 7:
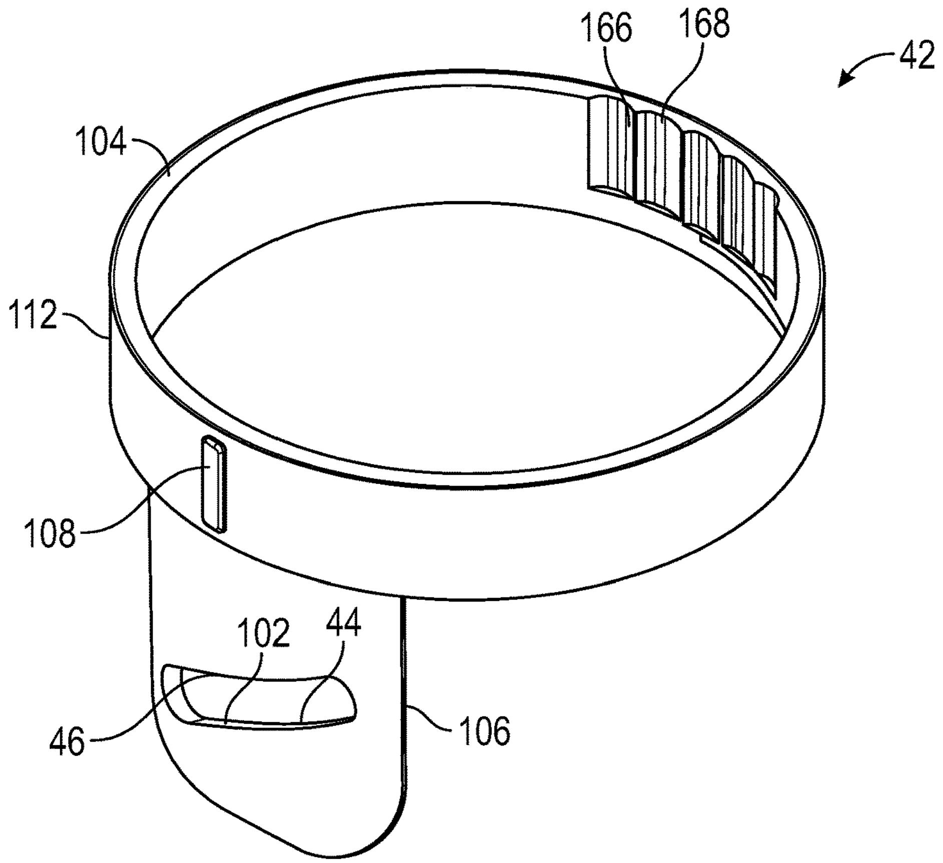
FIG. 7 is a perspective view of the rotatable adjustment member.
Figure 8:
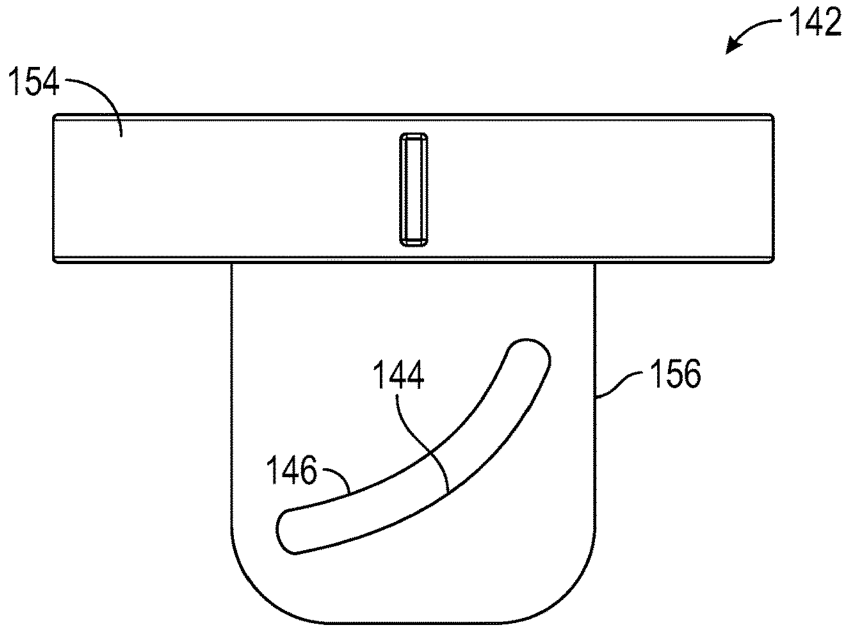
FIG. 8 is an elevation view of an alternative rotatable adjustment member.

With reference to FIG. 7, the rotatable adjustment member 42 includes a ring 104 and a flange 106 extending away from the ring 104. The rotatable adjustment member 42 can also include a tab 108 extending away from an external surface 112 of the ring 104. As seen in FIG. 1, the ring 104 is provided on the handle 12 so as to be accessible by an operator of the hair appliance 10. An operator can use the tab 108 as a gripping mechanism to rotate the rotatable adjustment member 42 about the longitudinal axis 74 of the handle 12 with respect to the handle 12. The flange 106 includes the slot 102, which also defines each of the contact surfaces 44, 46. As seen when comparing FIG. 1 to FIG. 3, the flange 106 can be offset radially inwardly from the external surface 112 of the ring 104. Due to the inclination of the contact surfaces 44, 46, rotation of the rotatable adjustment member 42 about the rotational axis, which is also coincident with the longitudinal axis 74 of the handle 12, results in translational movement of the slider 86, which can also result in similar translational movement in the direction of the double arrow 82 of the sliding actuator 38 on the switch 34. The contact surfaces 44, 46 can be in the form of inclined planes cooperating with the post 84. In the illustrated embodiment, the contact surfaces 44, 46 at least partially wrap around the rotational axis 74 of the rotatable adjustment member 42. FIG. 8 depicts an alternative rotatable adjustment member 142 where contact surfaces 144, 146 each follow a curve. The alternative rotatable adjustment member 142 can be similar to the rotatable adjustment member 42 in all other aspects including a ring 154 and a downwardly extending flange 156, Alternatively, the contact surfaces 44, 46, 144, 146 need not wrap around the rotational axis of either rotatable adjustment member 42, 142, but instead could follow along a line or a curve that resides in a plane that is offset from the rotational axis 74 of either rotatable adjustment member 42, 142.

Figure 9:
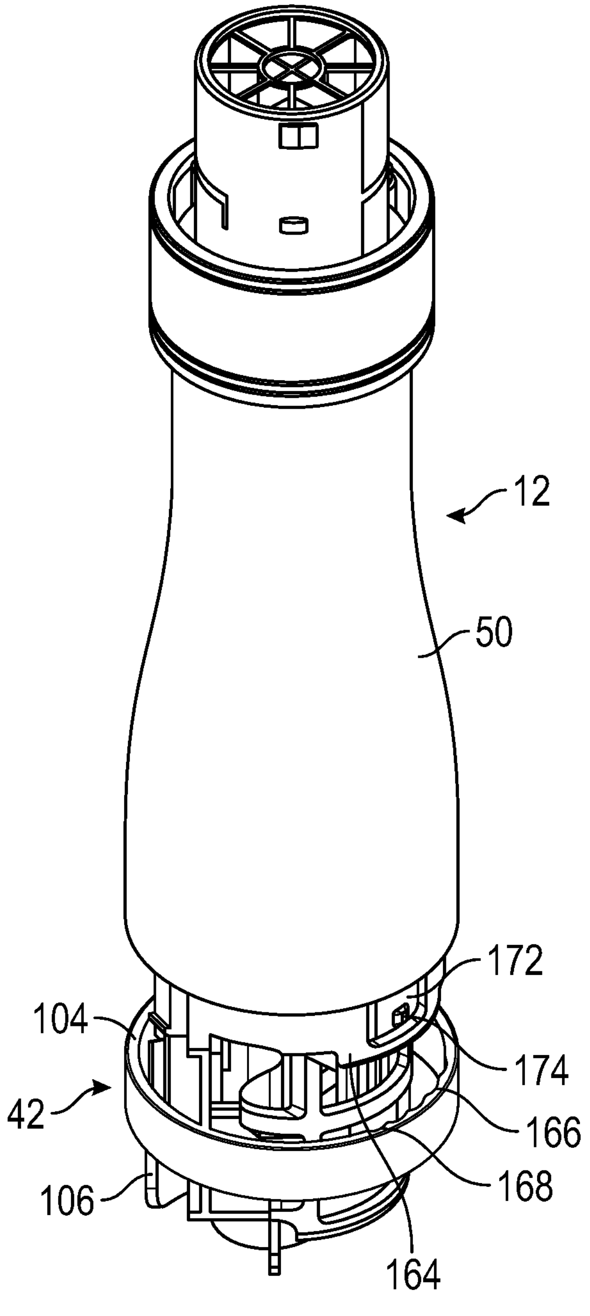
FIG. 9 is a perspective view of the portion of the hair appliance in FIG. 1 with the grill, cage, and foam removed and the rotatable adjustment member exploded from a handle to depict a detent mechanism.

With reference to FIGS. 7 and 9, the rotatable adjustment member 42 (as well as the alternative rotatable adjustment member 142) and a rear lower housing portion 164, which can be part of the handle 12, cooperate to define a detent mechanism having a plurality of positions corresponding to the multiple positions of the switch 34. The ring 104 includes peaks 166 and valleys 168 and the rear lower housing portion 164 includes a resilient tab 172 having a bump 174. Each valley 168 can correspond to one position among the plurality of positions of the detent mechanism corresponding to the multiple positions of the switch 34. The resilient tab 172 and the bump 174 can ride over peaks 166 and rest a respective valley 168 as the rotatable adjustment member 42 is rotated with respect to the handle 12.

A hair appliance and its accompanying switch mechanism has been described above in particularity. Modifications and alterations will occur to those upon reading and understanding the preceding detailed description. The invention, however, is not limited to only the embodiments described above. Instead, the invention is broadly defined by the appended claims and the equivalents thereof. It will be appreciated that various features of the above-disclosed embodiments and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A hair appliance comprising:

a handle;

an electrical component coupled with the handle and having a plurality of settings; and a switch mechanism in electrical communication with the electrical component and a power source, the switch mechanism including:

a switch having multiple positions and including a sliding actuator, each position corresponding to a respective setting for the electrical component; and a rotatable adjustment member including a contact surface operatively coupled with the sliding actuator such that rotational movement of the rotational adjustment member results in translational movement of the sliding actuator, wherein the sliding actuator is configured to translate in a direction parallel to a rotational axis of the rotatable adjustment member.

2. The hair appliance of claim 1, wherein the electrical component is one of a heater and a fan motor.

3. The hair appliance of claim 1, wherein the sliding actuator includes a post operatively coupled with the contact surface.

4. The hair appliance of claim 1, wherein the rotational axis is coincident with a longitudinal axis of the handle.

5. The hair appliance of claim 1, wherein the contact surface includes at least one inclined plane or curved surface.

6. The hair appliance of claim 1, wherein the contact surface includes at least one contact surface at least partially wrapping around the rotational axis of the rotatable adjustment member.

7. The hair appliance of claim 1, wherein the switch mechanism includes a slider operatively coupled with the sliding actuator.

8. The hair appliance of claim 7, wherein the handle includes a housing portion having an opening that receives the slider and confines the slider to translational movement.

9. A hair appliance comprising:

a handle;

an electrical component coupled with the handle and having a plurality of settings; and a switch mechanism in electrical communication with the electrical component and a power source, the switch mechanism including:

a switch having multiple positions and including a sliding actuator and a slider operatively coupled with the sliding actuator, each position corresponding to a respective setting for the electrical component; and a rotatable adjustment member including a contact surface operatively coupled with the sliding actuator such that rotational movement of the rotational adjustment member results in translational movement of the sliding actuator, wherein the slider includes a base and a post extending away from the base, wherein the post contacts the contact surface, and wherein the rotatable adjustment member includes a slot defining at least a portion of the contact surface and the slot receives the post.

10. The hair appliance of claim 9, wherein the base includes a pocket that receives the sliding actuator.

11. The hair appliance of claim 9, wherein the rotatable adjustment member includes a ring and a flange extending away from the ring, wherein the ring is provided on the handle so as to be accessible to an operator of the hair appliance and the flange includes the slot.

12. The hair appliance of claim 9, wherein the contact surface is one of a first contact surface and a second contact surface each defining a boundary of the slot.

13. The hair appliance of claim 12, wherein the first contact surface is spaced from the second contact surface a distance equal to a diameter of the post.

14. A hair appliance comprising:

a handle;

an electrical component coupled with the handle and having a plurality of settings; and a switch mechanism in electrical communication with the electrical component and a power source, the switch mechanism including:

a switch having multiple positions and including a sliding actuator, each position corresponding to a respective setting for the electrical component; and a rotatable adjustment member including a contact surface operatively coupled with the sliding actuator such that rotational movement of the rotational adjustment member results in translational movement of the sliding actuator, wherein the rotatable adjustment member includes a ring and a flange extending away from the ring, wherein the ring is provided on the handle so as to be accessible to an operator of the hair appliance and the flange includes the contact surface.

15. The hair appliance of claim 14, wherein the flange is offset radially inwardly from an external surface of the ring.

16. The hair appliance of claim 14, wherein the flange includes a slot defining at least a portion of the contact surface.

17. The hair appliance of claim 14, further comprising a housing portion, and the rotatable adjustment member and the housing portion cooperate to define a detent mechanism having a plurality of positions corresponding to the multiple positions of the switch.

18. The hair appliance of claim 17, wherein the ring includes peaks and valleys and the housing portion includes a resilient tab having a bump, where each valley corresponds to one position among the plurality of positions corresponding to the multiple positions of the switch.

* * * * *